(12) United States Patent
Izaki et al.

(10) Patent No.: US 8,760,601 B2
(45) Date of Patent: Jun. 24, 2014

(54) LIQUID CRYSTAL DISPLAY DEVICE AND POLARIZING PLATE

(75) Inventors: Akinori Izaki, Ibaraki (JP); Seiji Umemoto, Ibaraki (JP); Shouji Yamamoto, Ibaraki (JP); Kentarou Takeda, Ibaraki (JP); Mitsuru Suzuki, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 224 days.

(21) Appl. No.: 13/123,333

(22) PCT Filed: Oct. 9, 2009

(86) PCT No.: PCT/JP2009/067641
§ 371 (c)(1),
(2), (4) Date: Apr. 8, 2011

(87) PCT Pub. No.: WO2010/050355
PCT Pub. Date: May 6, 2010

(65) Prior Publication Data
US 2011/0194048 A1    Aug. 11, 2011

(30) Foreign Application Priority Data

Oct. 31, 2008  (JP) ................................ 2008-281998

(51) Int. Cl.
G02F 1/1335    (2006.01)
(52) U.S. Cl.
USPC .............................................. 349/62; 349/96
(58) Field of Classification Search
USPC ........................................ 349/96–99, 61–65
See application file for complete search history.

(56) References Cited

U.S. PATENT DOCUMENTS

| | | | |
|---|---|---|---|
| 5,496,527 A * | 3/1996 | Yokogawa et al. | ........... 423/338 |
| 6,559,912 B2 | 5/2003 | Aminaka | |
| 7,128,952 B2 | 10/2006 | Murakami et al. | |

(Continued)

FOREIGN PATENT DOCUMENTS

| | | |
|---|---|---|
| JP | 02-189505 A | 7/1990 |
| JP | 8-271733 A | 10/1996 |

(Continued)

OTHER PUBLICATIONS

Korean Office Action Aug. 30, 2012, issued in corresponding Korean Patent Application No. 10-2011-7009795, (9 pages). With English Translation.

(Continued)

*Primary Examiner* — Dung Nguyen
(74) *Attorney, Agent, or Firm* — Westerman, Hattori, Daniels & Adrian, LLP

(57) ABSTRACT

Provided is a liquid crystal display in which occurrence of iridescent unevenness is suppressed, even when a film with high level of mechanical properties, chemical resistance and water-barrier properties is used as a polarizer-protective-film. Also, disclosed is a polarizing plate to be used in the liquid crystal display. The liquid crystal display includes a liquid crystal cell, a light source, a first polarizing plate placed between the liquid crystal cell and the light source, and a second polarizing plate placed on a viewer side of the liquid crystal cell. The first polarizing plate includes a polarizer and a first protective film placed on a light source side principal surface of the first protective film, and the first protective film satisfies following relations: (i) $0 \text{ nm} \leq Re_1 \leq 3000 \text{ nm}$; (ii) $Nz_1 \geq 5$; and (iii) $Rth_1 > 2500 \text{ nm}$.

7 Claims, 4 Drawing Sheets

(56) References Cited

U.S. PATENT DOCUMENTS

| | | |
|---|---|---|
| 7,413,766 B2 | 8/2008 | Satake et al. |
| 7,504,139 B2 | 3/2009 | Kawanishi et al. |
| 2004/0021814 A1 | 2/2004 | Elman et al. |
| 2004/0027520 A1 | 2/2004 | Elman et al. |
| 2005/0206810 A1 | 9/2005 | Sasaki et al. |
| 2005/0231839 A1 | 10/2005 | Murakami et al. |
| 2007/0184212 A1 | 8/2007 | Nimura et al. |
| 2008/0239211 A1* | 10/2008 | Suzuki et al. ............ 349/96 |
| 2009/0016209 A1 | 1/2009 | Ikeda et al. |
| 2009/0141211 A1 | 6/2009 | Furuya et al. |
| 2009/0251650 A1* | 10/2009 | Fukagawa et al. ......... 349/119 |
| 2009/0297860 A1 | 12/2009 | Sasaki et al. |
| 2010/0231831 A1 | 9/2010 | Miyatake et al. |
| 2010/0309414 A1 | 12/2010 | Tomonaga et al. |
| 2011/0128477 A1 | 6/2011 | Izaki et al. |
| 2011/0194048 A1 | 8/2011 | Izaki et al. |
| 2012/0229735 A1 | 9/2012 | Miyatake et al. |

FOREIGN PATENT DOCUMENTS

| | | | |
|---|---|---|---|
| JP | 2001-272538 | A | 10/2001 |
| JP | 2002-225054 | A | 8/2002 |
| JP | 2002-249599 | A | 9/2002 |
| JP | 2004-004474 | A | 1/2004 |
| JP | 2004-46133 | A | 2/2004 |
| JP | 2004-070332 | A | 3/2004 |
| JP | 2004-277524 | A | 10/2004 |
| JP | 2006-241446 | A | 9/2006 |
| JP | 2006-251294 | A | 9/2006 |
| JP | 2007-047776 | A | 2/2007 |
| JP | 2007-293316 | A | 11/2007 |
| JP | 2008-003541 | A | 1/2008 |
| JP | 2009-031746 | A | 2/2009 |
| JP | 2009-157361 | A | 7/2009 |
| JP | 2010107892 | A | 5/2010 |
| TW | 2008-39323 | A | 10/2008 |
| TW | 2009-31132 | | 7/2009 |
| WO | 2010050355 | A1 | 5/2010 |

OTHER PUBLICATIONS

Chinese Office Action dated Sep. 5, 2012, issued in Chinese Patent Application No. 200980131867.8 (corresponding to U.S. Appl. No. 12/949,952) (10 pages). With English Translation.

Chinese Office Action dated Sep. 5, 2012, issued in corresponding Chinese Patent Application No. 201010523539.7, (11 pages). With English Translation.

International Search Report of PCT/JP2009/067641, mailing date of Dec. 15, 2009.

Japanese Office Action dated Mar. 24, 2010, issued in corresponding Japanese Patent Application No. 2008-281998.

Notification of Transmittal of Translation of the International Preliminary Report on Patentability (Form PCT/IB/338) of International Application No. PCT/JP2009/067641 mailed Jun. 16, 2011 with Forms PCT/IB/373 and PCT/ISA/237.

Japanese Office Action dated Dec. 25, 2012, issued in corresponding Japanese patent application No. 2010-118509, w/ English translation.

Taiwanese Office Action dated Jan. 29, 2013, issued in corresponding Taiwanese patent application No. 098135109, w/ English translation.

U.S. Office Action dated May 1, 2013, issued in related U.S. Appl. No. 12/949,952.

Korean Notice of Final Rejection dated Mar. 29, 2013, issued in corresponding Korean Patent Application No. 10-2011-7009795; with English translation (6 pages).

U.S. Office Action dated Jan. 23, 2013, issued in related U.S. Appl. No. 12/949,952.

Japanese Office Action dated May 1, 2013, issued in corresponding Japanese Patent Application No. 2009-270180, with English translation (4 pages).

US Office Action dated Aug. 15, 2013, issued in U.S. Appl. No. 12/949,952.

Taiwanese Office Action dated Sep. 26, 2013, issued in corresponding Taiwanese patent application No. 099137683, w/ English translation.

Chinese Office Action dated Oct. 12, 2013, issued in Chinese Patent Application No. 200980131867.8, 10 pages). With English Translation.

* cited by examiner

LIQUID CRYSTAL DISPLAY DEVICE AND POLARIZING PLATE

FIELD OF THE INVENTION

The invention relates to a liquid crystal display with high level of visibility.

BACKGROUND ART

A liquid crystal display (LCD), used in television, personal computer, mobile phone and the like, has a liquid crystal panel that includes a liquid crystal cell and polarizing plates placed on both sides of the liquid crystal cell so that it enables display by controlling an amount of transmission of light emitted from a light source. As LCDs have been rapidly developed, their functions and applications tend to be diversified, and they are required to withstand more harsh environments during use. For example, LCDs for mobile applications such as cellular phones and for vehicle applications such as car navigation systems are required to have durability even to more harsh environments during use. In addition, large-sized LCDs such as LCD televisions are required to have durability to higher temperature, because as their size and brightness increase, an amount of heat from the light source increases, so that the LCDs themselves tend to have high temperature. Thus, polarizing plates for use in LCDs are also required to have less changeable properties under harsh environments such as high temperature and high humidity, namely, to have high durability.

A polarizing plate generally has a structure in which a polarizer is provided between two protective films. Triacetylcellulose (TAC) is widely used for protective films. In view of durability as mentioned above, it is proposed to use, as a polarizer-protecting film, a film having a high level of mechanical properties, chemical resistance, and water-barrier properties, such as a polyethylene terephthalate (PET) film or a polyethylene naphthalate (PEN) film (see for example Patent Document 1).

A polyester film such as a PET or PEN film is highly stretched and crystallized and therefore has a high level of mechanical properties and other properties as mentioned above. However, the polyester film has high birefringence in the in-plane direction and the thickness direction, because its intrinsic birefringence is high and is highly stretched. Therefore, when a film made of a high-birefringence material, such as a polyester film is placed as a polarizer-protective-film between a polarizer and a liquid crystal cell, polarization is distorted between the polarizer and the liquid crystal cell due to an effect of the birefringence, so that visibility may tend to be significantly reduced. From this point of view, such a polyester film is generally used as a protective film for the principal surface of the polarizer on the side not facing the liquid crystal cell.

Such a film provided to protect the principal surface of the polarizer on the side not facing the liquid crystal cell does not change the polarization between the polarizer and the liquid crystal cell. Therefore, the effect of the birefringence on the display properties of the liquid crystal display is small, and the film is not necessarily required to have optical isotropy or birefringence uniformity. However, there is a problem in which when a polyester film is used as a protective film for the principal surface of the polarizer on the side not facing the liquid crystal cell in a polarizing plate placed on the light source side of a liquid crystal cell, iridescent unevenness (rainbow like unevenness) occurs to degrade visibility. Particularly, as the brightness and color purity of LCDs have increased in recent years, such iridescent unevenness becomes more likely to be visible, which becomes a hindrance to the use of a polyester film as a polarizer-protective-film.

From this point of view, it is proposed that a light scattering layer should be provided on the surface of a polarizer-protective-film, especially in a polarizing plate placed on the viewer side of the liquid crystal cell, so that mixing of optical paths, namely, mixing of colors can be made to make iridescent unevenness less visible. For example, Patent Document 2 discloses that when a light scattering layer is provided on the surface of a polyester film with an in-plane retardation of 500 nm or more to form a polarizer-protective-film, such iridescent unevenness can be reduced. Such a method can make iridescent unevenness less visible but does not prevent iridescent unevenness itself, so that sufficient visibility cannot be obtained in some cases. As the brightness and color purity of LCDs further increase, the occurrence of iridescent unevenness becomes more significant. It is therefore considered that it will be difficult to ensure sufficient visibility by such a color mixing method for canceling iridescent unevenness.

PRIOR ART DOCUMENTS

Patent Documents

Patent Document 1: Japanese Patent Application Laid-Open (JP-A) No. 08-271733
Patent Document 2: JP-A No. 2008-3541

SUMMARY OF THE INVENTION

Problems to be Solved by the Invention

An object of the invention is to provide a liquid crystal display that is prevented from suffering from iridescent unevenness, even when produced using a film with a high level of mechanical properties, chemical resistance and water-barrier properties, such as a polyester film, as a polarizer-protective-film.

The inventors have focused attention on preventing the occurrence of iridescent unevenness itself rather than cancelling the existing iridescent unevenness and have made a number of studies on principles of occurrence of iridescent unevenness. As a result, the invention has been made based on the finding that when a polarizing plate is produced using a film with specific optical properties as a polarizer-protective-film and used in the light source side of a liquid crystal display, iridescent unevenness is prevented with no loss of the special properties of the film, such as mechanical properties, chemical resistance, or water-barrier properties.

Thus, the invention is directed to a liquid crystal display including a liquid crystal cell, a light source, a first polarizing plate placed between the liquid crystal cell and the light source and a second polarizing plate placed on a viewer side of the liquid crystal cell, wherein the first polarizing plate includes a first protective film on a light source side principal surface of a polarizer.

In the liquid crystal display of the invention, the first protective film satisfies following relations:
(i) $0 \text{ nm} \leq Re_1 \leq 3000 \text{ nm}$;
(ii) $Nz_1 \geq 5$; and
(iii) $Rth_1 > 2500 \text{ nm}$.
($Re_1$, $Rth_1$ and $Nz_1$ are defined by following equations: $Re_1 = (nx_1 - ny_1)d_1$; $Rth_1 = (nx_1 - nz_1)d_1$; and $Nz_1 = Rth_1/Re_1$, wherein $d_1$ represents a thickness of the first protective film, $nx_1$ represents a refractive index in a direction of an in-plane slow axis of the protective film, $ny_1$ represents a refractive index in a direction of an in-plane fast axis of the protective film, and $nz_1$ represents a refractive index in a direction of the thickness of the protective film.)

In the liquid crystal display of the invention, the first protective film preferably includes aromatic polyester as a main component. More preferably, the first protective film includes polyethylene terephthalate or polyethylene naphthalate as a main component.

Further, it is preferable, in the liquid crystal display of the invention, that light emitted from the light source is incident in the form of substantially natural light on the first polarizing plate. From this point of view, a reflective polarizing film or an absorptive polarizing film is preferably not provided between the light source and the first polarizing plate in the liquid crystal display of the invention.

Effects of the Invention

In the liquid crystal display of the invention, a polarizing plate having the specific optical properties is used as a polarizer-protective-film, so that an occurrence of iridescent unevenness can be prevented and that improved visibility can be provided.

BRIEF DESCRIPTION OF DRAWINGS

FIGS. 3A to 3D are diagrams schematically showing polarization states which can be produced when light enters a medium of a different refractive index in the normal direction and oblique directions, in which FIG. 3A shows natural light, FIG. 3B shows polarized light having a vibration plane in the drawing plane, FIG. 3C shows polarized light having a vibration plane in a plane perpendicular to the drawing plane, and FIG. 3D shows elliptically polarized light.

EMBODIMENTS FOR CARRYING OUT THE INVENTION

Structural Outline of Liquid Crystal Display

Figure 1:
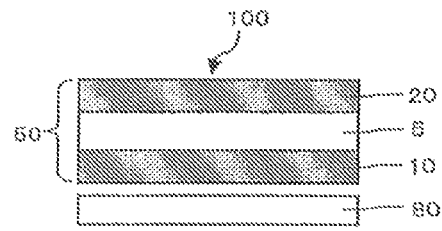
FIG. 1 is a schematic cross-sectional view of a liquid crystal display according to a preferable embodiment of the invention.

FIG. 1 shows a schematic cross-sectional view of a liquid crystal display according to a preferred embodiment of the invention. The liquid crystal display 100 includes a light source 80 and a liquid crystal panel 50, and a driving circuit (not shown) and other components are optionally incorporated therein.

The liquid crystal panel 50 includes a liquid crystal cell 5 and a first polarizing plate 10 provided on the light source 80 side of the liquid crystal cell 5. In general, a second polarizing plate 20 is provided on the opposite side (namely, the viewer side) of the liquid crystal cell 5 from the light source side. The liquid crystal cell 5 to be used may be of any type such as VA mode, IPS mode, TN mode, STN mode, or bend alignment ($\pi$ type) mode.

First Polarizing Plate

Figure 2A:
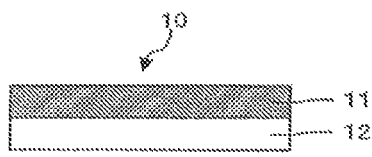
FIGS. 2A and 2B each shows a schematic cross-sectional view of an embodiment of a polarizing plate for use in a liquid crystal display of the invention.
Figure 2B:
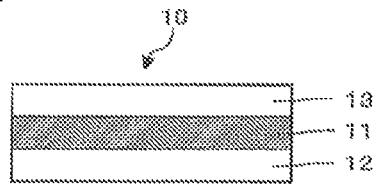

The first polarizing plate 10 is a light source side polarizing plate placed between the liquid crystal cell 5 and the light source 80. As shown in FIG. 2A, the first polarizing plate 10 includes a polarizer 11 and a first protective film 12 provided on one principal surface of the polarizer 11. In the liquid crystal display of the invention, the first polarizing plate is placed so that the first protective film 12 is placed on the light source 80 side of the polarizer 11. As shown in FIG. 2B, the polarizing plate 10 generally has a second protective film 13 provided on the opposite side principal surface of the polarizer 11 from the surface on which the first protective film is provided, namely, provided on the liquid crystal cell 5 side of the polarizer 11 in the liquid crystal display. In an embodiment of the invention, however, such a second protective film may be omitted.

Polarizer

The polarizer 11 may be a film capable of converting natural light or polarized light into the desired polarized light. Although, an appropriate arbitrary polarizer may be used, a polarizer that converts natural light or polarized light into linearly polarized light is preferably used. As a polarizer, for example, a film that is uniaxially stretched after having dichroic materials, such as iodine and dichromatic dye, absorbed to hydrophilic polymer films, such as polyvinyl alcohol-based film, partially formalized polyvinyl alcohol-based film, and ethylene-vinyl acetate copolymer-based partially saponified film; polyene-based alignment films, such as dehydrated polyvinyl alcohol and dehydrochlorinated polyvinyl chloride, etc. may be mentioned. Alternatively, the polarizer may be an O-type polarizer in which a liquid crystalline composition containing a dichroic material and a liquid crystalline compound is oriented in a certain direction as disclosed in U.S. Pat. No. 5,523,863 or may be an E-type polarizer in which a lyotropic liquid crystal is oriented in a certain direction as disclosed in U.S. Pat. No. 6,049,428.

Among such polarizers, a polarizer comprising a polyvinyl alcohol-based film containing iodine is preferably used, because it has a high degree of polarization and high-adherent to a polarizer-protective-film.

First Protective Film

Materials

In the liquid crystal display of the invention, a film with good mechanical properties is preferably used as the first protective film 12 provided on the light source 80 side of the polarizer 11. For example, such a film with good mechanical properties preferably includes a (semi)crystalline material as a main component. Typically, it preferably includes polyester as a main component. As crystallization proceeds by heating or the like, the degree of crystallinity of polyester increases, which makes it possible to increase its mechanical strength, dimensional stability, or heat resistance. Therefore, use of polyester for a polarizer-protective-film makes it possible to improve the mechanical strength or heat durability of the polarizing plate. As compared with triacetylcellulose (TAC) widely used for conventional polarizer-protective-films, polyester has high gas-barrier properties and particularly low water vapor permeability. Thus, use of polyester for a polarizer-protective-film makes it possible to improve the humidity resistance of the polarizing plate.

For example, the polyester may be a polyester resin selected from homopolymers obtained by polycondensation of one dicarboxylic acid and one diol, copolymers obtained by polycondensation of one or more dicarboxylic acids and two or more diols, or copolymers obtained by polycondensation of two or more dicarboxylic acids and one or more diols, and a resin blend containing two or more of the homopolymers or copolymers, in which examples of one or more dicarboxylic acids include terephthalic acid, isophthalic acid, orthophthalic acid, 2,5-naphthalenedicarboxylic acid, 2,6-naphthalenedicarboxylic acid, 1,4-naphthalenedicarboxylic acid, 1,5-naphthalenedicarboxylic acid, diphenylcarboxylic acid, diphenoxyethanedicarboxylic acid, diphenylsulfonecarboxylic acid, anthracenedicarboxylic acid, 1,3-cyclopentanedicarboxylic acid, 1,3-cyclohexanedicarboxylic acid, 1,4-cyclohexanedicarboxylic acid, hexahydroterephthalic acid, hexahydroisophthalic acid, malonic acid, dimethylmalonic acid, succinic acid, 3,3-diethylsuccinic acid, glutaric acid, 2,2-dimethylglutaric acid, adipic acid, 2-methyladipic acid, trimethyladipic acid, pimelic acid, azelaic acid, dimer acid, sebacic acid, suberic acid, and dodecadicarboxylic acid, and examples of one or more diols include ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexanediol, 2,2-bis(4-hydroxyphenyl)propane, and bis(4-hydroxyphenyl)sulfone. In particular, aromatic polyester is preferred, because of its crystallinity, and in particular, polyethylene terephthalate (PET) or polyethylene naphthalate (PEN) is preferably used.

For example, a polyester film may be obtained by a method including melt-extruding the polyester resin into a film-shape melt and cooling and solidifying the melt in a casting drum to form a film. In an embodiment of the invention, a stretched polyester film, in particular, a biaxially-stretched polyester film is preferably used in order that crystallinity may be imparted to the polyester film to achieve the properties described above. When the first protective film used includes aromatic polyester as a main component, the film may contain any other resin than aromatic polyester, an additive, or any other material. The term "includes aromatic polyester as a main component" means that the film contains 50% by weight or more, preferably 60% by weight or more, more preferably 70% by weight or more, even more preferably 80% by weight or more of aromatic polyester, based on the total weight of the film.

To form a stretched film for use as the first protective film, any type of stretching method may be used, such as longitudinal uniaxial stretching, transverse uniaxial stretching, sequential biaxial (longitudinal and transverse) stretching, or simultaneous biaxial (longitudinal and transverse) stretching. As mentioned above, biaxial stretching is preferably used. Stretching means may be any appropriate stretching machine such as a roll stretching machine, a tenter stretching machine, or a pantograph- or linear motor-type biaxial stretching machine.

Retardation Properties

The first protective film has a thickness $d_1$, a refractive index $nx_1$ in the direction of its in-plane slow axis, a refractive index $ny_1$ in the direction of its in-plane fast axis, a refractive index $nz_1$ in the direction of its thickness, an in-plane retardation $Re_1$ defined by $Re_1=(nx_1-ny_1)d_1$, a thickness direction retardation $Rth_1$ defined by $Rth_1=(nx_1-nz_1)d_1$, and an $Nz_1$ value defined by $Nz_1=Rth_1/Re_1$, wherein $Re_1$, $Rth_1$ and $Nz_1$ satisfy the following relations: (i) 0 nm≤$Re_1$≤3,000 nm; (ii) $Nz_1$≤5; and (iii) $Rth_1$>2,500 nm.

The liquid crystal display of the invention is characterized in that the protective film 12 has the retardation properties described above, so that it is prevented from suffering from iridescent unevenness, even when a high-birefringence material such as a crystalline polyester film is used as the protective film 12, which is placed between the light source 80 and the polarizer 11 of the first polarizing plate 10 provided as a light source side polarizing plate. In the conventional art, use of polyester films has been limited due to the effect of iridescent unevenness by their high birefringence, although it has been proposed that they should be used for polarizer-protective-films, because of their high mechanical strength and other properties and their relatively low cost. The invention has been made based on the new finding that when a polyester film having optical properties in the specified range is used, iridescent unevenness can be prevented without losing the advantage of the polyester film.

According to the relation (i), the first protective film has an in-plane retardation $Re_1$ of 3,000 nm or less. If the in-plane retardation is too high, iridescent unevenness may tend to significantly occur. Therefore, it is preferred that $Re_1$ be relatively low. Specifically, $Re_1$ is preferably 2,000 nm or less, more preferably 1,000 nm or less, even more preferably 450 nm or less, particularly preferably 400 nm or less, most preferably 350 nm or less. Iridescent unevenness will tend to be reduced as the in-plane retardation further decreases. On the other hand, in order that the in-plane retardation of a film including, as a main component, a high-intrinsic-birefringence material such as aromatic polyester may be adjusted to a low level, the stretch ratio should be kept low, or the thickness of the film should be reduced, which may tend to make it difficult to improve the mechanical strength of the film. It is not impossible to reduce the in-plane retardation by highly controlling the stretching process, but in such a case, the polyester film may tend to be expensive. In view of these points, $Re_1$ should generally be 10 nm or more, preferably 30 nm or more, more preferably 50 nm or more, as a realistic value.

According to the relation (ii), the $Nz_1$ of the first protective film, namely, the ratio of the thickness direction retardation $Rth_1$ to the in-plane retardation $Re_1$ is 5 or more. Iridescent unevenness will tend to be reduced as Nz increases. Therefore, $Nz_1$ is preferably relatively high, specifically, preferably 6 or more, more preferably 7 or more. While the Nz value is uniquely determined by the values of the in-plane retardation $Re_1$ and the $Rth_1$, its upper limit is theoretically infinite (in the case that $Re_1=0$). Therefore, the Nz value does not particularly have an upper limit in the realizable range.

According to the relation (iii), the first protective film has a thickness direction retardation $Rth_1$ of more than 2,500 nm. When the thickness direction retardation is larger than the in-plane retardation, the $Nz_1$ value becomes larger, so that iridescent unevenness will tend to be reduced. In addition, there is a correlation between a large retardation in the thickness direction and a high degree of in-plane molecular orientation of films, and in polyester films, crystallization tends to proceed as the molecular orientation increases. Also in view of the mechanical strength or dimensional stability of the film, therefore, it is preferred that $Rth_1$ be relatively high. $Rth_1$ is preferably 4,000 nm or more, more preferably 5,000 nm or more, even more preferably 6,000 nm or more, still more preferably 7,000 nm or more, most preferably 8,000 nm or more. On the other hand, a further increase in $Rth_1$ needs an increase in the thickness of the film. The increase in the film thickness may tend to increase the cost or the thickness of the polarizing plate or the liquid crystal panel. From these points of view, $Rth_1$ is preferably 16,000 nm or less, more preferably 15,000 nm or less, even more preferably 14,000 nm or less.
Thickness While the first protective film may have any thickness as long as it has retardation properties according to the relations (i), (ii) and (iii), it preferably has a thickness of 10 to 200 µm, more preferably 15 to 150 µm, even more preferably 20 to 100 µm. If the thickness of the film is too small, the film may have insufficient mechanical properties or low handleability, so that its function as a polarizer-protective-film may be insufficient. If the thickness of the film is too large, it may be difficult to keep the in-plane retardation at low level, or the cost may tend to increase.
Other Properties The thickness direction retardation $Rth_1$ is expressed by the product of the thickness $d_1$ and the difference between the refractive index $nx_1$ in the direction of the in-plane slow axis of the film and the refractive index $nz_1$ in the direction of the thickness of the film, namely, the birefringence $(nx_1-nz_1)$ in the thickness direction. The birefringence $(nx_1-nz_1)$ in the thickness direction correlates with the degree of in-plane orientation of molecules in the film. Specifically, the larger $(nx_1-nz_1)$ indicates the higher degree of in-plane orientation of molecules and the enhanced degree of crystallinity, which means that the film strength tends to be high. Contrarily, if $(nx_1-nz_1)$ is small, the film strength may tend to be low. Mechanical strength should be imparted to the first protective film so that it can be practically useful as a polarizer-protective-film, while the liquid crystal display is prevented from suffering from iridescent unevenness. In addition, the thickness of the film should be reduced so that an increase in the cost and thickness of the liquid crystal panel can be suppressed. From these points of view, it is preferred that $(nx_1-nz_1)$ be relatively large. Specifically, $(nx_1-nz_1)$ is preferably 0.04 or more, more preferably 0.06 or more, even more preferably 0.08 or more. On the other hand, $(nx_1-nz_1)$ does not exceed the intrinsic birefringence value, which means that it may have a natural upper limit. For example, therefore, the $(nx_1-nz_1)$ value of a polyethylene terephthalate film is generally 0.25 or less, preferably 0.20 or less.

Figure 3A:
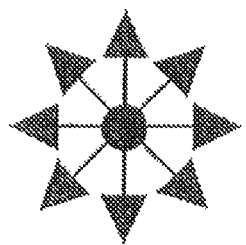
Figure 3B:
Figure 3C:
Figure 3D:
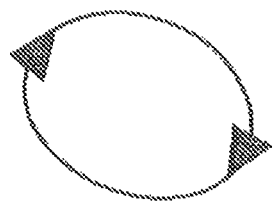
Figure 4:
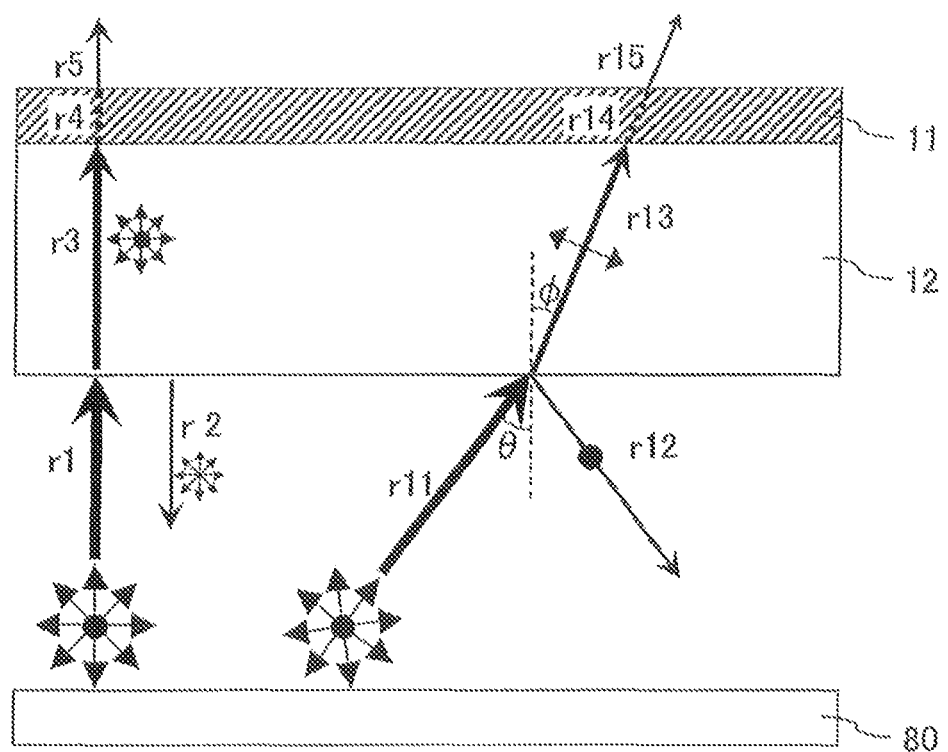
FIG. 4 is a schematic diagram for illustrating how light emitted from a light source travels through the first protective film to reach a polarizer

To reduce back scattering of incident light from the light source and to keep the brightness of the liquid crystal display high, for example, the haze of the first protective film is preferably as low as less than 10%. The first protective film to be used may be provided with an easy-adhesion layer for improving the tackiness to the polarizer, or provided with any surface treatment layer such as a hard-coat layer on the side where the polarizer is not bonded, namely, on the light source side surface.
Principles of Elimination of Iridescent Unevenness How the first protective film having the optical properties described above prevents iridescent unevenness in a liquid crystal display is described below based on the presumed principles.
Principles of Occurrence of Iridescent Unevenness FIGS. 3A to 3D are diagrams schematically showing polarization states which can be produced when light enters a medium of a different refractive index in the normal direction and oblique directions. FIG. 3A shows natural light, FIG. 3B polarized light having a vibration plane in the drawing plane, FIG. 3C polarized light having a vibration plane in a plane perpendicular to the drawing plane, and FIG. 3D elliptically polarized light. FIG. 4 schematically shows how light emitted from a light source 80 travels through the first protective film 12 to reach a polarizer 11. It will be understood that although FIG. 4 and FIGS. 5A and 5B (described below) show that reflected light r12 and light r13 traveling through the first protective film each have a single polarized component, these drawings are diagrams for schematically illustrating principles according to the invention and do not indicate that the light actually has only a single polarized component.

In FIG. 4, natural light r1 emitted from the light source 80 travels in the normal direction of the surface of the first protective film 12, namely, the normal direction of the screen of a liquid crystal display, and is partially reflected from the interface of the first protective film 12 so that it is returned as natural light r12 toward the light source. On the other hand, light r3 not reflected from the interface and entering the first protective film mostly travels through the first protective film to reach the polarizer 11 while having an unpolarized state. One of the linearly polarized components of light r4 entering the polarizer 11 is absorbed by the polarizer 11, so that the other of the linearly polarized components forms outgoing light r5 to reach the liquid crystal cell.

On the other hand, natural light r11 obliquely incident at an angle θ on the first protective film 12 from the light source 80 is partially reflected as reflected light r12 to the light source side, and the remainder forms incident light r13, which enters the first protective film 12. In this process, reflected light r12 and incident light r13 are each partially separated into a p-polarized component and an s-polarized component to form partially polarized light. In this case, the reflectivities $R_p$ and $R_s$ of the p- and s-polarized components of the reflected light r12 derived from the incident light r11 are expressed by the Fresnel formulae below, respectively.

$$R_p = \{\tan(\theta-\phi)/\tan(\theta+\phi)\}^2 \quad \text{(formula 1)}$$

$$R_s = \{\sin(\theta-\phi)/\sin(\theta+\phi)\}^2 \quad \text{(formula 2)}$$

wherein θ represents the incident angle of the light r11, φ represents the refractive angle of the light r13, and both angles follow Snell's law as shown below with respect to the refractive index $n_1$ (≈1) of the incident side medium (specifically air) and the refractive index $n_2$ of the first protective film 12.

$$n_1 \sin\theta = n_2 \sin\phi \quad \text{(formula 3)}$$

As can be seen from formulae (1) and (2), the reflectivity $R_s$ of the s-polarized component is generally higher than the reflectivity $R_p$ of the p-polarized component. Therefore, when the light r11 enters the first protective film with a refractive index $n_2$ from an air layer with a refractive index $n_1$ (of about 1), the light r13 traveling through the first protective film 12 forms "p-polarized-component-rich" partially polarized light in which the intensity of the p-polarized component is higher than that of the s-polarized component. In particular, a polyester film has a refractive index of about 1.60, which is higher than that of a TAC film (about 1.43 in refractive index) widely used as a polarizer-protecting film in conventional techniques, and biaxial stretching further increases the birefringence. Therefore, when a film having high refractive index or high birefringence, such as a polyester film, is used as the first protective film, the light r13 travels in the form of p-polarized-component-richer, partially polarized light through the first protective film.

Figure 5A:
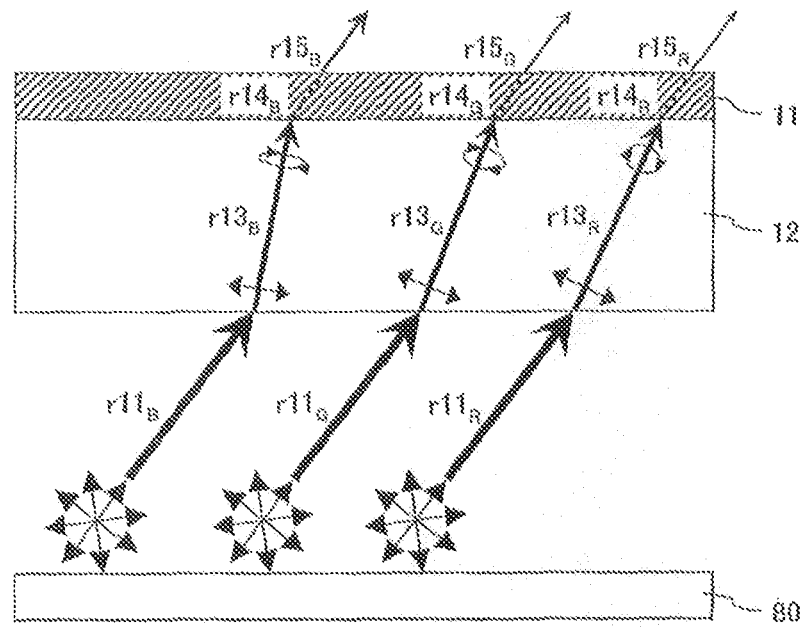
FIG. 5A is a schematic diagram for illustrating how the polarization state changes when light emitted from a light source travels through the first protective film to reach a polarizer.

The p-polarized component-rich, partially polarized light r13 is changed in polarization by the birefringence effect of the first protective film 12 while traveling through the protective film 12. Thus, the polarization of part of the p-polarized-component-rich, partially polarized light r13 is changed to a different polarization (mainly an elliptical polarization) when the light r13 goes out of the first protective film 12 and enters the polarizer 11. It will be understood that not only polyester but any substances have so-called "wavelength dispersion" so that their refractive indices vary with wavelength. Thus, the angle φ of refraction of the natural light r11 incident on the first protective film 12 also varies with wavelength. For example, as schematically shown in FIG. 5A, the natural light r11 entering the first protective film 12 includes blue light $r13_B$ entering the film 12 at a refraction angle $\phi_B$, green light $r13_G$ entering the film 12 at a refraction angle $\phi_G$, and red light $r13_R$ entering the film 12 at a refraction angle $\phi_R$, in which the refraction angles generally satisfy $\phi_B<\phi_G<\phi_R$. In addition, the retardation which the light r13 traveling through the first protective film undergoes also varies with wavelength. Thus, the blue light $r13_B$, the green light $r13_G$, and the red light $r13_R$ have different partial polarizations, when they reach the polarizer.

Therefore, light r14 traveling through the polarizer 11 is absorbed in amounts varying with wavelength. As a result, the intensity of light r15 going out of the polarizer also varies with wavelength as schematically indicated by $r15_B$, $r15_G$, and $r15_R$ in FIG. 5A. Thus, when a film with large birefringence is used as the protective film, the spectral form of light r15 transmitted to the liquid crystal cell through the polarizer differs from the spectral form of the incident light r11 due to the effect of the refractive index and the birefringence of the protective film, and as a result, coloring occurs. The coloring generated by the principle described above is called "chromatic polarization." Particularly when the apparent retardation is approximately 350 nm or more, coloring tends to occur due to such chromatic polarization. Coloring caused by chromatic polarization also tends to periodically change depending on the apparent retardation.

The first protective film has three-dimensional, refractive-index anisotropy, and therefore, its apparent retardation varies with the incidence angle θ. In addition, due to the three-dimensional, refractive-index anisotropy and the absorbance anisotropy, the apparent slow-axis direction of the first protective film 12 and the apparent absorption-axis direction of the polarizer 11 also vary with viewing angle. Therefore, the spectrum of the light absorbed by the polarizer varies with viewing angle, so that the coloring caused by chromatic polarization varies with viewing angle. The angular variation of the coloring is observed as iridescent unevenness by the viewer's eyes. As the incidence angle θ increases, the absolute value of the amount of change of the apparent retardation Re(θ) of the first protective film per unit amount of angular change, namely, |dRe(θ)/dθ| increases. Therefore, as the viewing angle increases, the change of the coloring caused by the angular variation increases. Therefore, as the viewing angle θ increases, the occurrence of iridescent unevenness tends to become more significant.

Principles of Elimination of Iridescent Unevenness

In order to prevent the coloring caused by such chromatic polarization, a low-birefringence material may be used for the protective film. On the other hand, polyester films have a problem in which when they are unstretched and have low birefringence, their mechanical strength is not enough to show the special properties of the polyester material. To show the special properties of a polyester film, stretching is essential. Therefore, it would be substantially impossible to reduce the apparent retardation of a polyester film to less than 300 nm at all viewing angles, if the polyester film is produced so as to have such a thickness and a mechanical strength that it can function as a polarizer-protective-film.

In light of the principles of occurrence of iridescent unevenness, the invention has been made based on the finding that when the in-plane retardation $Re_1$ of the polyester protective film is kept low according to the relation (i) and when the $Nz_1$ value is kept high according to the relation (ii), iridescent unevenness resulting from chromatic polarization can be prevented even though the thickness retardation $Rth_1$ is set high according to the relation (iii).

Figure 5B:
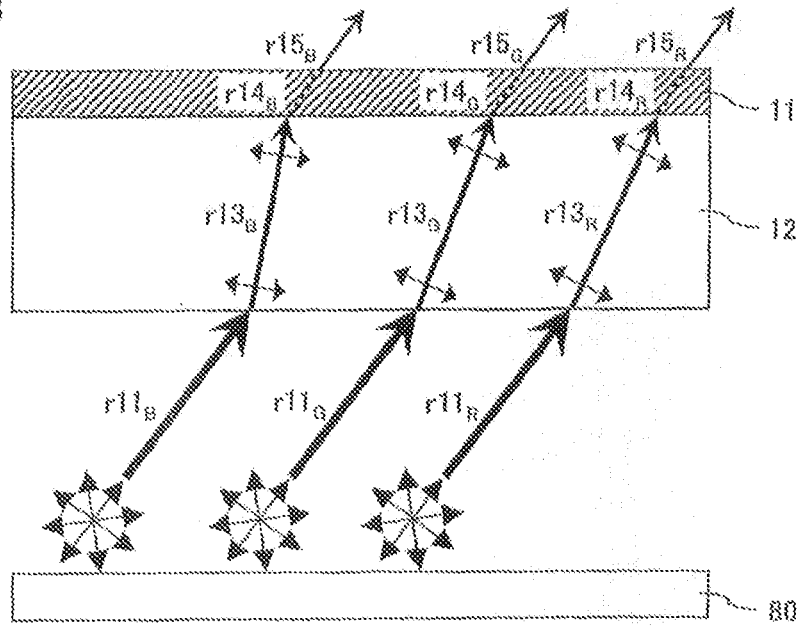
FIG. 5B is a schematic diagram for illustrating the variation of polarization state changes when light emitted from a light source travels through the first protective film to reach a polarizer, in the case where a C-plate is used as the first protective film.

A film having an in-plane retardation of approximately zero and a certain level of thickness direction retardation (e.g., about 100 nm or more) is generally called "C-plate." It is known that when light is obliquely incident on such a C-plate, the apparent slow axis direction makes an azimuth angle of 90° with the viewing angle direction. The direction at an azimuth angle of 90° with respect to the viewing angle is coincident with the vibration direction of s-polarized light. Concerning light transmitting through a C-plate, therefore, the apparent slow axis direction falls within the vibration plane of the s-polarized light. Likewise, the apparent fast axis direction of the C-plate falls within the vibration plane of the p-polarized light. Therefore, when the first protective film is a C-plate, the light $r13_B$, $r13_G$ and $r13_R$ transmitting through the first protective film 12 is not influenced by birefringence, as schematically shown in FIG. 5B, so that its polarization state is not substantially changed. Thus, even when the thickness direction retardation $Rth_1$ is high, chromatic polarization-induced coloring does not occur, so that iridescent unevenness also does not occur.

From these points, it is apparent that the in-plane retardation $Re_1$ of the first protective film should preferably be reduced so that iridescent unevenness can be suppressed. On the other hand, iridescent unevenness is significant when the viewing angle θ is large. In such a range, therefore, if a manner of variation in the apparent slow axis direction of the first protective film with viewing angle is substantially same as that of a C-plate's, iridescent unevenness will be prevented. Thus, $Nz_1$ is preferably large, so that the manner of variation in the apparent slow axis direction can substantially be same as that of the C-plate's when the viewing angle θ is large.

As described above, chromatic polarization-induced iridescent unevenness does not significantly occur around the normal direction where the viewing angle θ is relatively small, as compared with the region where the viewing angle θ is large. Further, if $Nz_1$ is in the specified range, the manner of variation in the apparent slow-axis direction of the first protective film can be substantially same as that of a C-plate's even when the first protective film has a certain level of in-plane retardation. Thus, iridescent unevenness is not observed when $Re_1$, $Rth_1$ and $Nz_1$ are each in the specified range. The relations (i) and (iii) indicates such an acceptable retardation range. The examples described below demonstrate that iridescent unevenness is suppressed in such a range.

Second Protective Film

As shown in FIG. 2B, the first polarizing plate 10 may have a second protective film 13. In this case, while the material and optical properties of the second protective film are not particularly restricted, the second protective film is preferably produced with an optically-isotropic material having substantially no birefringence or a material that has high in-plane uniformity of retardation value or high in-plane uniformity of the optical axis direction, even when it has birefringence, because the second protective film is placed between the polarizer and the liquid crystal cell 5. A retardation film (optical compensation layer) may also be used as the second protective film.

Materials

In an embodiment of the invention, materials for the second protective film in the polarizing plate preferably include, but are not limited to, transparent polymers having uniform optical properties as mentioned above. Particularly in view of transparency (low haze), amorphous polymers are preferably used. From these points of view, examples of materials for the second protective film include cellulose resins, cyclic polyolefin resins (norbornene resins), polycarbonate resins, polyarylate resins, amorphous polyester resins, polyvinyl alcohol resins, polysulfone resins, and polyimide resins.

Oriented liquid crystal polymer layers may also be used instead of the above polymer films or formed on the above polymer films. Examples of the liquid crystal polymer include various main-chain or side-chain types having a liquid crystal molecular orientation property-imparting conjugated linear atomic group (mesogen) introduced in a main or side-chain of a polymer. Examples of the main chain type liquid crystal polymer include polymers having a mesogen group bonded thereto via a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side-chain having a mesogen moiety that comprises a nematic orientation-imparting para-substituted cyclic compound unit and is bonded thereto via a spacer moiety comprising a conjugated atomic group.

Retardation Properties

The second protective film may be optically isotropic and have substantially no birefringence. In this case, a film having an in-plane retardation $Re_2$ of less than 40 nm and a thickness direction retardation $Rth_2$ of less than 80 nm may be used as the second protective film. Such a protective film having good optical isotropy is preferably an unstretched film. The in-plane retardation $Re_2$ and thickness direction retardation $Rth_2$ of the second protective film are determined from the thickness $d_2$, the refractive index $nx_z$ in the direction of the in-plane slow axis, the refractive index $ny_2$ in the direction of the in-plane fast axis, and the refractive index $nz_z$ in the direction of the thickness in the same manner as described above for the first protective film.

Alternatively, a film having an in-plane retardation of 40 nm or more and/or a thickness direction retardation of 80 nm or more may be used as the second protective film, so that it can also serves as a retardation film. In this case, the in-plane retardation or the thickness direction retardation of the second protective film may be appropriately adjusted to the value necessary for a retardation film served as optical compensator. A stretched film is preferably used as the retardation film. The retardation film to be used may be selected from films satisfying the relation: $nx_2=ny_2>nz_2$, $nx_2>ny_2>nz_2$, $nx_2>ny_2=nz_2$, $nx_2>nz_2>ny_2$, $nz_2=nx_2>ny_2$, $nz_2>nx_2>ny_2$, or $nz_2>nx_2=ny_2$, depending on various applications. The relation $ny_2=nz_2$ is intended to include not only the case where $ny_2$ is completely equal to $nz_2$ but also the case where $ny_2$ is substantially equal to $nz_2$.

Thickness

The second protective film preferably has a thickness of 5 to 500 μm, more preferably 5 to 200 μm, even more preferably 10 to 150 μm. If the thickness is below the range, the film may be more likely to break, so that a strength problem may occur when it is used in the polarizing plate or it may have insufficient water-barrier properties, which may degrade the durability of the polarizer. If the thickness is above the range, the film may lack flexibility, so that the handleability of the film may be low or it may be difficult to manufacture the film.

Haze

The haze of the second protective film is preferably 2% or less, more preferably 1% or less. If the haze of the second protective film is high, the polarization state or directivity of the light constantly polarized by the polarizer may be non-uniformly changed by scattering, so that the contrast of the liquid crystal display may be reduced.

Formation of First Polarizing Plate

The first polarizing plate 10 is formed by laminating the polarizer 11 and the first protective film 12 and optionally the second protective film 13. The polarizer and the protective film may be laminated by any method. In view of workability and light use efficiency, the polarizer and the protective film are preferably laminated with an adhesive or pressure-sensitive adhesive layer interposed therebetween so that no air gap will be created. When an adhesive or pressure-sensitive adhesive layer is used, any of various types of adhesive or pressure-sensitive adhesives may be used.

Particularly to increase the adhesion between the polarizer and the protective film, an adhesive layer is preferably used in the lamination of them. For example, the adhesive to be used in the formation of an adhesive layer may be appropriately selected from adhesives containing, as a base polymer, an acryl-based polymer, a silicone-based polymer, polyester, polyurethane, polyamide, polyvinyl ether, a vinyl acetate-vinyl chloride copolymer, modified polyolefin, an epoxy-based polymer, a fluoropolymer, or a rubber polymer such as a natural rubber polymer or a synthetic rubber polymer. In particular, an aqueous adhesive is preferably used in the lamination of the polarizer and an optically-isotropic film. An adhesive containing a polyvinyl alcohol-based resin as a main component is particularly used.

Examples of polyvinyl alcohol-based resin for use in the adhesive include polyvinyl alcohol resin and acetoacetyl group-containing polyvinyl alcohol resin. Acetoacetyl group-containing polyvinyl alcohol resin is preferably used to improve the durability of the polarizing plate, because it can form a polyvinyl alcohol-based adhesive having a highly reactive functional group. In order to prevent defective irregularities (knicks), it is also preferred that a metal colloid be added to the adhesive as described in JP-A No. 2008-15483.

Before the adhesive or pressure-sensitive adhesive is applied, the protective film may be subjected to a surface modification treatment such as hydrophilization for adhesion improvement or any other purpose. Examples of such a treatment include a corona treatment, a plasma treatment, a primer treatment, and a saponification treatment.

Arrangement Angle

The angular relation between the first protective film and the polarizer is not particularly restricted. In order to prevent iridescent unevenness, the direction of the slow axis of the first protective film 12 is preferably substantially parallel or perpendicular to the direction of the absorption axis of the polarizer 11. When they are arranged parallel or perpendicular to each other, iridescent unevenness can be prevented even when the first protective film has an in-plane retardation $Re_1$ of 300 nm or more. The term "substantially parallel or perpendicular" means that the angle between them is not only 0° or 90° but also in the range of 0° or 90°±15°, preferably ±12°, more preferably ±10°. When the first protective film is "substantially a C-plate," for example, which has a small in-plane retardation $Re_1$ of 100 nm or less, preferably 50 nm or less, the arrangement angle little effects on the development of iridescent unevenness.

Arrangement on Viewer Side of Liquid Crystal Cell

The liquid crystal panel 50 is formed by placing the first polarizing plate 10 on the light source side of the liquid crystal cell 5. As shown in FIG. 1, the second polarizing plate 20 is generally placed on the viewer side of the liquid crystal cell 5. The second polarizing plate 20 may be of any known appropriate type. In addition, any of various other optical films than the second polarizing plate, such as an optical compensation film, may also be provided on the viewer side of the liquid crystal cell 5.

Formation of Liquid Crystal Panel

A method of placing the polarizing plate on the liquid crystal cell preferably includes laminating them with a pressure-sensitive adhesive layer. For example, the pressure-sensitive adhesive to be used in the formation of the pressure-sensitive adhesive layer may be appropriately selected from, but not limited to, pressure-sensitive adhesives containing, as a base polymer, an acryl-based polymer, a silicone-based polymer, polyester, polyurethane, polyamide, polyether, a fluoropolymer, or a rubber polymer. In particular, preferably used is a pressure-sensitive adhesive having a high level of transparency, weather resistance and heat resistance and exhibiting an appropriate degree of wettability, cohesiveness and tackiness, such as an acrylic pressure-sensitive adhesive. In addition, a pressure-sensitive adhesive layer may be placed as a superimposed layer of different composition or types.

In view of workability in the process of laminating the liquid crystal cell and the polarizing plate, the pressure-sensitive adhesive layer is preferably formed in advance on one or both of the polarizing plate and the liquid crystal cell. The thickness of the pressure-sensitive adhesive layer may be appropriately determined depending on the intended use, the adhesive strength or the like. The thickness of the pressure-sensitive adhesive layer is generally from 1 to 500 µm, preferably from 5 to 200 µm, particularly preferably from 10 to 100 µm.

Release Film

A release film (separator) may be temporary attached to an exposed side of a pressure-sensitive adhesive layer to prevent contamination etc., until it is practically used. Thereby, it can be prevented that foreign matter contacts pressure-sensitive adhesive layer in usual handling. As a release film, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

Formation of Liquid Crystal Display

The liquid crystal display of the invention is obtained by assembling the liquid crystal panel 50 and the light source 80 and optionally by incorporating a driving circuit and other components. While, if necessary, any of various other components than the above may be combined to form the liquid crystal display, the liquid crystal display of the invention is preferably such that the light emitted from the light source 80 is incident in the form of substantially natural light on the first polarizing plate 10.

As described above, according to the invention, the first protective film has specific retardation properties so that the birefringence-induced change of the polarization of partially polarized light, which is produced upon incidence of the light from the light source 80 into the first protective film 12, can be controlled while it travels through the first protective film and therefore so that chromatic polarization-induced coloring can be suppressed. However, if the light incident on the first protective film already has a specific polarization, a polarized component different from the partially polarized light, which would otherwise be produced by the separation of polarized light at the interface on which natural light is incident, will enter the first protective film and be changed in polarization by the birefringence of the first protective film. This may cause iridescent unevenness due to such a different polarized component even when the retardation properties of the first protective film are controlled as described above. To prevent iridescent unevenness, therefore, the light incident on the first polarizing plate 10 is preferably in the form of substantially natural light.

The term "substantially natural light" refers to light in such a state that no specific polarized component is richer than any other polarized component. In general, substantially natural light refers to light with an Im/Ix ratio of 0.90 or more, wherein Ix represents the maximum of the intensity $I(\psi)$ of the outgoing light measured through the polarizing plate (provided as an analyzer on the outgoing light-receiving side) in the direction ($\psi$) of its absorption axis being rotated by 360° (so-called rotating analyzer method), and Im represents the minimum of the intensity $I(\psi)$. The Im/Ix is preferably 0.95 or more, more preferably 0.99 or more. The Im/Ix of natural light is the maximum, which is 1.

As described above, the light emitted from the light source 80 should be incident, in the form of substantially natural light, on the first polarizing plate 10. From this point of view, polarization separating means such as a reflective polarizing film or an absorptive polarizing film is preferably not provided between the light source 80 and the first polarizing plate 10 in the liquid crystal display of the invention. For example, a linearly-polarizing, reflective, brightness enhancement film is widely used in liquid crystal displays so that the efficiency of use of light from a light source can be improved by separating light from the light source into polarized components and by utilizing the reflexive light. To prevent iridescent unevenness, however, such a brightness enhancement film is preferably not used.

In the liquid crystal display of the invention, the light to be incident on the first polarizing plate from the light source preferably has low directivity. In liquid crystal displays, for example, concentrating light in the normal direction is widely performed using a prism sheet or a lens sheet to increase the efficiency of use of light from the light source. Unfortunately, such a converging device as a prism or lens sheet uses light refraction to increase light directivity and therefore can produce partially polarized light upon incidence and exit of light. In such a case, therefore, natural polarization properties tend to be lost as the light directivity increases.

In general, light sources for liquid crystal displays are broadly divided into a direct type and a sidelight type. The sidelight type requires light from the side to be directed to the normal direction, which requires a converging device as described above. From this point of view, a direct type backlight is preferably used in the liquid crystal display of the invention.

The liquid crystal display obtained as described above may be used in various applications including OA equipment such as personal computer monitors, notebook computers, and copy machines; portable equipment such as cellular phones, watches, digital cameras, personal digital assistances (PDAs), and portable game machines; domestic electrical equipment such as video cameras, televisions, and microwave ovens; vehicle equipment such as back monitors, monitors for car navigation systems, and car audios; display equipment such as information monitors for stores; alarm systems such as surveillance monitors; and care and medical equipment such as care monitors and medical monitors.

EXAMPLES

The invention is further described by the Examples blow, which are not intended to limit the scope of the invention. The Examples, Reference Examples and Comparative Examples below were evaluated by the methods described below.

Measurement and Evaluation Methods
Retardation

The in-plane retardation was measured under an environment at 23° C. using a polarization/retardation measurement system (AxoScan (product name) manufactured by Axometrics, Inc.) at a measurement wavelength of 590 nm. In addition, the film was inclined by 40° around the slow axis direction and the fast axis direction as a rotation center, and then the retardation was measured under the same conditions. The order of the measured retardation value was determined so as to agree with the wavelength dispersion of the retardation of a polyester film determined in advance.

The in-plane retardation, the thickness direction retardation and Nz were calculated from these measured valued.

Evaluation of Iridescent Unevenness

In a darkroom at 23° C., a white image was displayed on the liquid crystal display, and whether or not iridescent coloring was present on the screen was checked by visual observation, while the polar angle was changed between 40° and 70° at an azimuth angle of about 15° using the absorption axis direction of the viewer side polarizing plate as a reference azimuth angle. The iridescent unevenness was rated on a scale of 1 to 4 as shown below.

1: The hue significantly varies as the angle changes.
2: The hue significantly varies in an angular range where the polar angle is between about 40° and 60°, which is narrower than that in the case of a scale of 1.
3: The hue significantly varies in an angular range where the polar angle is between about 40° and 50°, which is narrower than that in the case of a scale of 2.
4: Almost no variation of the hue is observed as the angle changes.

Comparative Example 1

Preparation of Polyester Film

A 200 μm thick unstretched polyethylene terephthalate film (amorphous) was subjected to free-end uniaxial stretching (longitudinal stretching) in the machine direction for the manufacture of it at a stretch ratio of 2.5 times and then subjected to fixed-end uniaxial stretching (transverse stretching) in the width direction at a stretch ratio of 4.0 times using a tenter stretching machine, so that a crystalline polyester film having a thickness of 50 μm was obtained. This polyester film was named "protective film A."

Formation of Easy-Adhesion Layer on the Polyester Film

The surface of the protective film A was subjected to a corona treatment. A polyester-based, aqueous dispersion urethane adhesive (SUPERFLEX SF210 (trade name) manufactured by DAI-ICHI KOGYO SEIYAKU CO., LTD.) was then applied to the protective film A using a coating tester equipped with a #200 mesh gravure roll. The coating was dried at 150° C. for 1 minute, so that a 0.3 μm thick easy-adhesion layer was formed on the film.

Preparation of Polarizer

A polyvinyl alcohol film with an average degree of polymerization of 2,700 and a thickness of 75 μm was stretched and fed, while it was dyed between rolls having different rotating speeds. First, the polyvinyl alcohol film was stretched to 1.2 times in the feed direction, while it was allowed to swell by immersion in a water bath at 30° C. for 1 minute. Thereafter, the film was stretched in the feed direction to 3 times the original length of the unstretched film, while it was dyed by immersion in an aqueous solution at 30° C. containing 0.03% by weight of potassium iodide and 0.3% by weight of iodine for 1 minute. The film was then stretched to 6 times the original length in the feed direction, while it was immersed for 30 seconds in an aqueous solution at 60° C. containing 4% by weight of boric acid and 5% by weight of potassium iodide. The obtained stretched film was then dried at 70° C. for 2 minutes to give a polarizer. The polarizer had a thickness of 30 μm and a water content of 14.3% by weight.

Preparation of Adhesive

Under the condition of a temperature of 30° C., 100 parts by weight of an acetoacetyl group-containing polyvinyl alcohol resin (1,200 in average degree of polymerization, 98.5% by mole in degree of saponification, 5% by mole in degree of acetoacetylation) and 50 parts by weight of methylol melamine were dissolved in pure water to form an aqueous solution with a solids content of 3.7% by weight. An aqueous adhesive solution containing colloidal metal was prepared by adding, to 100 parts by weight of the aqueous solution, 18 parts by weight of an aqueous solution containing positively-charged colloidal alumina (15 nm in average particle size) at a solid concentration of 10% by weight. The adhesive solution had a viscosity of 9.6 mPa·s and a pH in the range of 4 to 4.5. The amount of the colloidal alumina was 74 parts by weight, based on 100 parts by weight of the polyvinyl alcohol resin. The average particle size of the colloidal alumina was measured with a particle size distribution meter (Nanotrack UPA150, manufactured by Nikkiso Co., Ltd.) by dynamic light scattering method (optical correlation technique).

Preparation of Polarizing Plate

The adhesive was applied to the surface of the polarizer so that an 80 nm thick adhesive layer could be formed after drying, and the protective film A with easy-adhesion layer was laminated to one of the principal surfaces of the polarizer, while a retardation film (WVBZ (trade name) manufactured by Fujifilm Corporation) made of a cellulose-based resin, serving as both of optical compensation layer and a polarizer-protective film, was laminated to the other principal surface of the polarizer. Lamination of the films was performed by roller laminator. The obtained laminate was dried at 70° C. for 6 minutes, so that a polarizing plate was obtained. The lamination of the protective film A to the polarizer was performed in such a manner that the easy-adhesion-layer side surface of the protective film A faced the polarizer. The obtained polarizing plate having optical compensation layer was named "polarizing plate A".

Polarizing Plate on Viewer Side

A commercially available polarizing plate (NPF VEGQ1724DU (trade name) manufactured by NITTO DENKO CORPORATION) having a polarizer and a retardation film placed on one side of the polarizer was used as a light source side polarizing plate. This commercially available polarizing plate was composed of a polarizer made of an iodine-containing, polyvinyl alcohol-based film, a retardation film (WVBZ (trade name) manufactured by Fujifilm Corporation) made of a cellulose-based resin and placed on one principal surface of the polarizer (the polarizer surface to be placed on the liquid crystal cell side), and a triacetylcellulose film placed on the other principal surface, which were laminated with an adhesive layer interposed therebetween. This polarizing plate was named "polarizing plate X".

Preparation of Liquid Crystal Panel

The liquid crystal panel was taken out from a liquid crystal television (LC32-D30 (trade name) manufactured by SHARP CORPORATION) equipped with a VA-mode liquid crystal cell and a direct-type backlight. The polarizing plate and the optical compensation film placed on the upper and lower sides of the liquid crystal cell were removed from the panel, and the glass surfaces (front and back) of the liquid crystal cell were cleaned. Subsequently, the polarizing plate A was placed on the light source side surface of the liquid crystal cell with an acrylic pressure-sensitive adhesive interposed therebetween so that it was in the same direction as the absorption axis of the light source side polarizing plate that had been placed in the original liquid crystal panel and that the optical compensation layer side surface of the polarizing plate A faced the liquid crystal cell. The polarizing plate X was then placed on the viewer side surface of the liquid crystal cell with an acrylic pressure-sensitive adhesive interposed therebetween so that it was in the same direction as the absorption axis of the viewer side polarizing plate that had been placed in the original liquid crystal panel and that the optical compensation layer side surface of the polarizing plate X faced the liquid crystal cell. As a result, a liquid crystal panel was obtained, which had the liquid crystal cell, the polarizing plate A placed on one side principal surface of the cell, and the polarizing plate X placed on the other side principal surface of the cell.

Preparation of Liquid Crystal Display

The liquid crystal panel was incorporated into the original liquid crystal display. Thirty minutes after the light source of the liquid crystal display was turned on, whether or not iridescent unevenness occurred was visually evaluated.

Examples 1 to 5 and Comparative Examples 2 to 5

Preparation of Polyester Films

Crystalline polyester films with different retardation properties were prepared using the process of manufacturing the polyester film in Comparative Example 1, except that the longitudinal stretch ratio and the transverse stretch ratio were changed as shown in Table 1. The polyester films were named "protective films B, C, D, E, F, G, H, and I", respectively. The polyethylene terephthalate film (amorphous) obtained before the stretching in the process of manufacturing the polyester film in Example 1 was named "protective film J".

Preparation of Polarizing Plates

The easy-adhesion layer was formed on each polyester film as in Comparative Example 1, except that each of the protective films B to J was used in place of the protective film A, and a polarizing plate was prepared using each product. The obtained polarizing plates were named "polarizing plates B, C, D, E, F, G, H, I, and J."

Formation of Liquid Crystal Panels

A liquid crystal panel was obtained as in Comparative Example 1, except that each of the polarizing plates B to J was used in place of the polarizing plate A. As a result, liquid crystal panels were obtained, in which each of the polarizing plates B to J was placed on the light source side principal surface of the liquid crystal cell, and the polarizing plate X was placed on the viewer side principal surface of the liquid crystal cell.

Preparation of Liquid Crystal Display

Each of the liquid crystal panels was incorporated into the original liquid crystal display. Thirty minutes after the light source of the liquid crystal display was turned on, whether or not iridescent unevenness occurred was visually evaluated.

Comparative Example 6

Preparation of Polarizing Plate

A polarizing plate was prepared as the polarizing plate in Example 1, except that a triacetylcellulose film (ZRF80S (trade name) manufactured by FUJIFILM Corporation) whose in-plane and thickness retardations were approximately 0 nm was used as one polarizer-protecting film in place of the retardation film made of cellulose resin and that the protective film B was used as the other protective film. The obtained polarizing plate is named "polarizing plate K."

Formation of Liquid Crystal Panel

A liquid crystal panel was formed as in Example 1, except that the polarizing plate K was used in place of the polarizing plate B and placed on the light source side of the liquid crystal cell with an acrylic pressure-sensitive adhesive interposed therebetween in such a manner that the protective film B side surface faced the liquid crystal cell.

Preparation of Liquid Crystal Display

The liquid crystal panel described above was incorporated into the original liquid crystal display, and then, as in the Examples, whether or not iridescent unevenness occurred was visually evaluated.

Reference Example 1

The same liquid crystal panel was used as that prepared in Example 1. The liquid crystal panel was incorporated into the original liquid crystal display, and in that process, a reflective, linearly-polarizing film ("D-BEF" (trade name) manufactured by 3M Company) comprising a laminate of alternating anisotropic thin films was placed between the liquid crystal panel and the light source in such a manner that the direction of its transmission axis was parallel to the direction of the transmission axis of the light source side polarizing plate B, so that a liquid crystal display was obtained. Then, whether or not iridescent unevenness occurred was visually evaluated as in the Examples.

Figure 6:
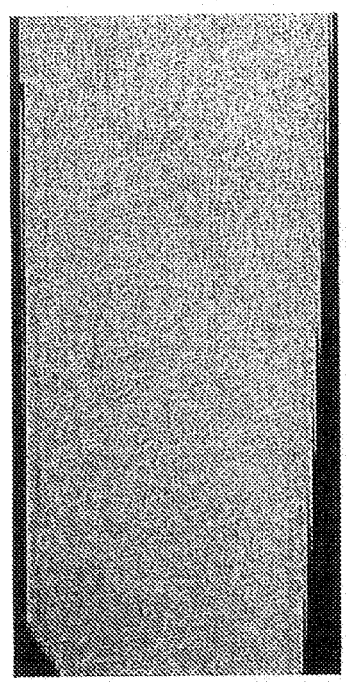
FIG. 6 is a photograph showing the display state when the liquid crystal display of Comparative Example 1 is obliquely viewed.
Figure 7:
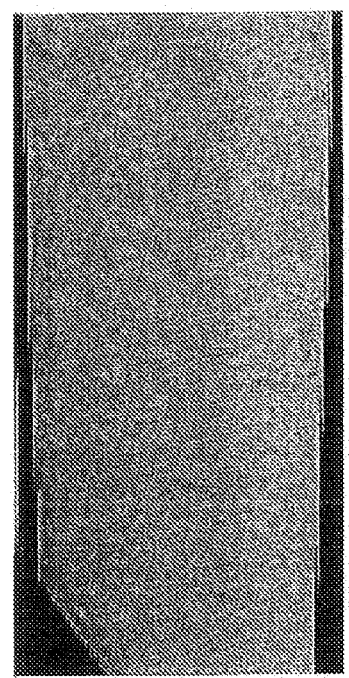
FIG. 7 is a photograph showing the display state when the liquid crystal display of Example 1 is obliquely viewed.

Table 1 summarizes and shows the retardation properties of each protective film and the results of the evaluation of iridescent unevenness in the liquid crystal displays obtained in the Examples, the Comparative Examples, and the Reference Example. FIGS. 6 and 7 (photographs) show the display states on the screens of the liquid crystal displays of Comparative Example 1 and Example 1, respectively, when viewed in an oblique direction.

TABLE 1

| | | Viewer side polarizing plate | | | | | | |
|---|---|---|---|---|---|---|---|---|
| | | Stretch ratio | | Optical properties of protective film | | | Liquid crystal display | |
| | Polarizing plate type | Longitudinal direction | Transverse direction | Re | Rth | NZ | Arrangement of polyester film | Iridescent unevenness |
| Comparative Example 1 | A | 2.5 | 4.0 | 3070 | 8500 | 2.8 | Light source side | 1 |
| Example 1 | B | 2.8 | 2.9 | 500 | 6800 | 13.6 | Light source side | 4 |

TABLE 1-continued

|  | | Viewer side polarizing plate | | | | | | |
|---|---|---|---|---|---|---|---|---|
| | | Stretch ratio | | Optical properties of protective film | | | Liquid crystal display | |
| | Polarizing plate type | Longitudinal direction | Transverse direction | Re | Rth | NZ | Arrangement of polyester film | Iridescent unevenness |
| Example 2 | C | 2.5 | 3.5 | 1500 | 7800 | 5.2 | Light source side | 2 |
| Example 3 | D | 2.8 | 3.1 | 590 | 4570 | 7.7 | Light source side | 4 |
| Example 4 | E | 2.5 | 3.4 | 1100 | 6500 | 5.9 | Light source side | 3 |
| Example 5 | F | 2.8 | 3.2 | 1100 | 7100 | 6.5 | Light source side | 4 |
| Comparative Example 2 | G | 3.3 | 3.5 | 1800 | 7400 | 4.1 | Light source side | 1 |
| Comparative Example 3 | H | 2.0 | 2.5 | 2000 | 4000 | 2.0 | Light source side | 1 |
| Comparative Example 4 | I | 2.2 | 2.1 | 200 | 1100 | 5.5 | Light source side | 3 |
| Comparative Example 5 | J | 0 | 0 | 10 | 240 | 24.0 | Light source side | 4 |
| Comparative Example 6 | K | 2.8 | 2.9 | 500 | 6800 | 13.6 | Liquid crystal cell side | 1 |
| Reference Example 1 | B | 2.5 | 4.0 | 500 | 6800 | 13.6 | Light source side | 1 |

As is clear from a comparison between FIGS. 6 and 7, iridescent coloring is observed on the screen of the liquid crystal panel of the Comparative Example in an oblique view, but in the Example, such coloring is not observed, and a uniform display is obtained. Further, as is evident from Table 1, iridescent unevenness is suppressed in the liquid crystal display of each Example in which the in-plane retardation, the thickness direction retardation and Nz of the first protective film are each in the specified range, as compared with the liquid crystal displays of Comparative Examples 1 to 3. It is also apparent that in the Examples, as the Nz of the first protective film increases, the occurrence of iridescent unevenness is more suppressed.

In Comparative Example 6 where the light source side polarizing plate was placed in such a manner that the polyester film was on the liquid cell side, the screen was significantly colored iridescent by the effect of the birefringence of the polyester film. On the other hand, in Comparative Example 4 where a polyester film stretched at a low ratio (protective film I) was used and in Comparative Example 5 where an unstretched amorphous polyester film (protective film J) was used, the protective film had a low retardation in the thickness direction and had a low level of mechanical strength and chemical resistance, although iridescent unevenness tended to be reduced.

In Reference Example 1, the light incident on the light source side polarizing plate was not in the form of substantially natural light, so that iridescent unevenness was observed, though the same polarizing plate B as in Example 1 was used as the light source side polarizing plate. This is because a reflective polarizing film was placed between the light source side polarizing plate and the light source.

DESCRIPTION OF REFERENCE CHARACTERS

| 5 | a Liquid crystal cell |
|---|---|
| 10 | a polarizing plate |
| 11 | a polarizer |
| 12 | a protective film |
| 13 | a protective film |
| 20 | a polarizing plate |
| 50 | a liquid crystal panel |
| 80 | a light source |
| 100 | a liquid crystal display |

The invention claimed is:

1. A liquid crystal display, comprising:
a liquid crystal cell;
a light source;
a first polarizing plate placed between the liquid crystal cell and the light source; and
a second polarizing plate placed on a viewer side of the liquid crystal cell,
wherein the first polarizing plate comprises a polarizer and a first protective film placed on a light source side principal surface thereof,
wherein, among protective films included in first polarizing plate and the second polarizing plate, only the first protective film satisfies following relations:
(i) 0 nm≤$Re_1$≤3000 nm;
(ii) $Nz_1$≥5; and
(iii) $Rth_1$>2500 nm,
wherein $Re_1$, $Rth_1$ and $Nz_1$ are defined by following equations:

$Re_1=(nx_1-ny_1)d_1$;

$Rth_1=(nx_1-nz_1)d_1$; and $Nz_1=Rth_1/Re_1$, wherein
$d_1$ represents a thickness of the first protective film,
$nx_1$ represents a refractive index in a direction of an in-plane slow axis of the protective film,
$ny_1$ represents a refractive index in a direction of an in-plane fast axis of the protective film, and $nz_1$ represents a refractive index in a direction of the thickness of the protective film, and each refractive index being measured at 23° C. at a measurement wavelength of 590 nm;

wherein light emitted from the light source is incident on the first polarizing plate in the form of substantially natural light with an Im/Ix ratio of 0.90 or more, wherein Ix and Im represents maximum and minimum, respectively, of light intensity measured by rotating analyzer method, in which analyzer is rotated by 360°.

2. The liquid crystal display according to claim 1, wherein the first protective film comprises aromatic polyester as a main component.

3. The liquid crystal display according to claim 2, wherein the aromatic polyester is polyethylene terephthalate or polyethylene naphthalate.

4. The liquid crystal display according to claim 1, wherein neither reflective polarizing film nor absorptive polarizing film is provided between the light source and the first polarizing plate.

5. The liquid crystal display according to claim 1, wherein the first polarizing plate has no protective film on a liquid crystal cell side principal surface of the polarizer.

6. The liquid crystal display according to claim 1, wherein the first polarizing plate further comprises a second protective film on a liquid crystal cell side principal surface of the polarizer.

7. The liquid crystal display according to claim 1, wherein the first protective film has a haze of less than 10%.

* * * * *